Figure 1:
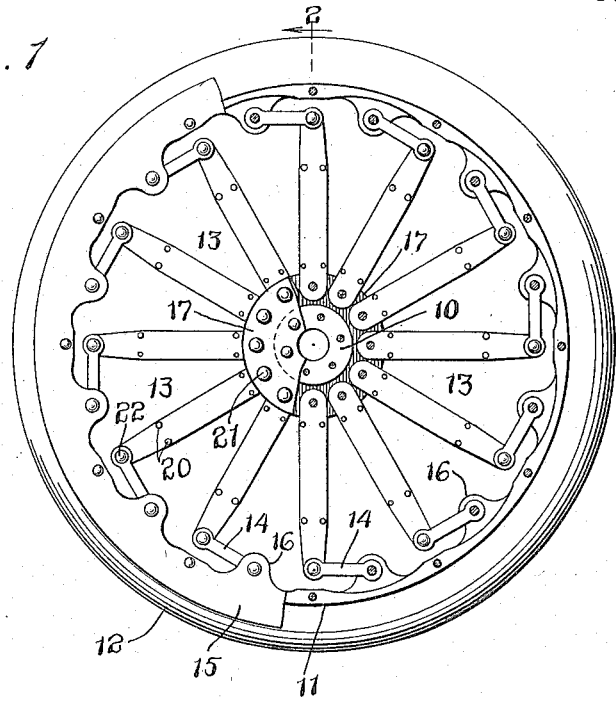

W. R. HOPSON.
RESILIENT VEHICLE WHEEL.
APPLICATION FILED JULY 1, 1914.

1,221,053.

Patented Apr. 3, 1917.
2 SHEETS—SHEET 1.

WITNESSES:
H. W. Meade
S. W. Atherton

INVENTOR
William R. Hopson
BY
A. M. Wooster
ATTORNEY

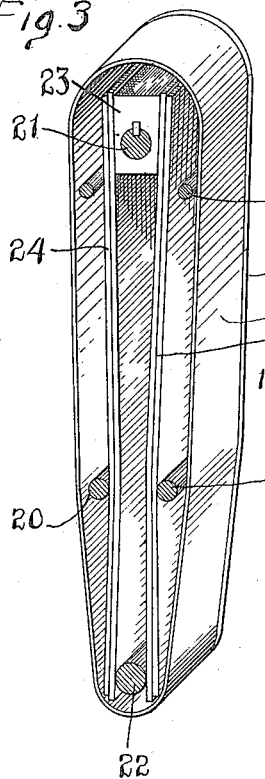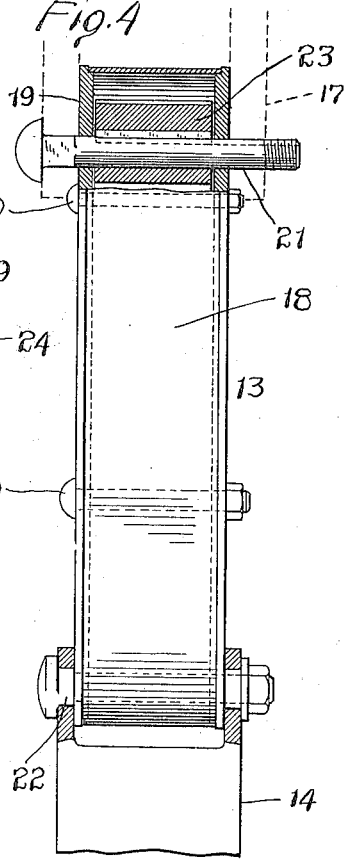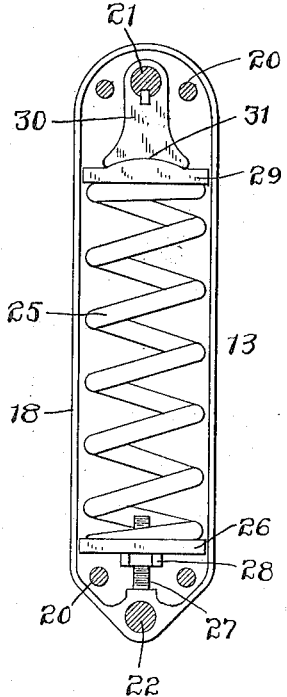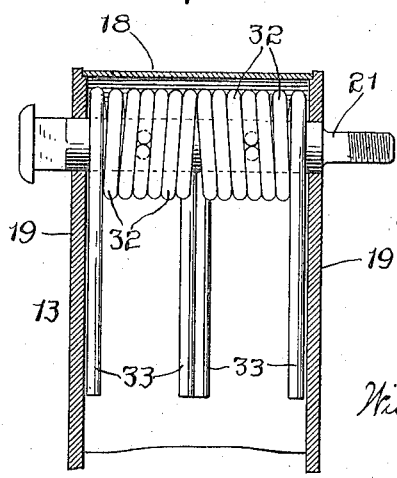

UNITED STATES PATENT OFFICE.

WILLIAM R. HOPSON, OF BRIDGEPORT, CONNECTICUT.

RESILIENT VEHICLE-WHEEL.

1,221,053. Specification of Letters Patent. Patented Apr. 3, 1917.

Application filed July 1, 1914. Serial No. 848,345.

*To all whom it may concern:*

Be it known that I, WILLIAM R. HOPSON, a citizen of the United States, residing at Bridgeport, county of Fairfield, State of Connecticut, have invented an Improvement in Resilient Vehicle-Wheels, of which the following is a specification.

This invention has for its object to produce a resilient vehicle wheel in which the rotary motion of the hub or the rim shall be transmitted to the other member by means of pivoted spokes having resilient elements within and resisting the oscillation thereof.

A further object of the invention is to facilitate the combination of essential features within a resilient wheel.

Figure 2:
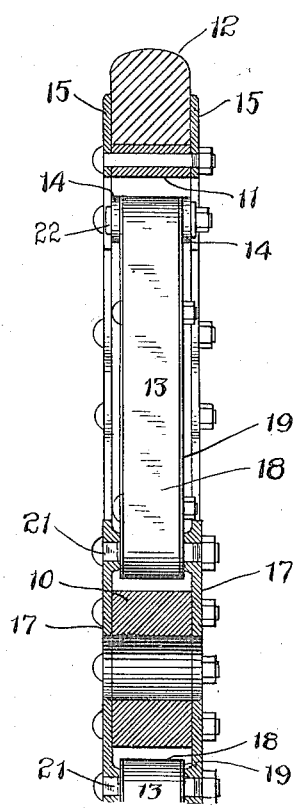

With these and other objects in view I have devised the novel resilient wheel which I will now describe, referring to the accompanying drawings forming a part of this specification and using reference characters to indicate the several parts:

Figure 1 is a side elevation of my novel wheel partly broken away;

Fig. 2 a section on an enlarged scale on the line indicated by 2 in Fig. 1, looking in the direction of the arrow;

Fig. 3 a perspective view of a spoke, on an enlarged scale, one of the side plates being removed and the bolts and pivots in section;

Fig. 4 a view partly in elevation and partly in section as seen from the left in Fig. 3;

Fig. 5 an elevation of a spoke with the side plate removed, illustrating a form of the invention using a different type of spring, and Fig. 6 is a view partly in elevation and partly in section illustrating a form of the invention using still another type of spring.

10 denotes the hub, 11 the rim and 12 a tire. 13 denotes the spokes as a whole, 14 which are radially disposed, and 14 the links. I have shown the tire as retained in place by face plates 15 which are bolted to the rim and are provided with ears 16 between which the links are pivoted, and have shown face plates 17 bolted to the hub between which the spokes are pivoted. The spokes are shown as comprising a body 18 and side plates 19 preferably shouldered and secured to the body by bolts 20. 21 denotes the pivots of the spokes to the hub and 22 the pivots of the spokes to the links.

In Figs. 2, 3 and 4, I have shown the use of one type of springs, and in Figs. 5 and 6, I have illustrated the use of other types of springs.

Turning now to Figs. 3 and 4, 23 denotes an angular cam block keyed or otherwise rigidly secured to pivot 21. Flat springs 24 bear against opposite flat sides of the cam block and extend substantially the length of the spoke, the lower ends of the springs lying on opposite sides of pivot 22. I have shown the use of double leaf springs, but the number of leaves used is of course immaterial. In order to increase the initial tension of the springs on the cam block, the leaves are preferably sprung inward more or less and are retained under tension by two of the bolts 20.

In the form illustrated in Fig. 5, a strong coil spring 25, disposed longitudinally of the spoke, is substituted for the leaf springs of the other form. At one end of the spoke, in the present instance at the link end, is a plate 26 against which the spring bears. A threaded rod 27 is rigidly secured in the end of the body and extends inward passing through the plate. The tension of the spring may be regulated by raising or lowering the plate by means of a nut 28 on the threaded rod. The other end of the spring bears against a plate 29 which is in turn engaged by a cam block 30 keyed or otherwise rigidly secured to pivot 21. In order to increase the action of the cam block, plate 29 is preferably provided on its upper side with a rounded boss 31, and the engaging face of the cam block is a concave curve corresponding with the curvature of the boss.

In the form illustrated in Fig. 6 the cam block is dispensed with and coil springs 32 surrounding pivot 21 are used. Four springs are shown, one end of each spring being rigidly secured to pivot 21 and the other end extended tangentially and bearing against the body, as at 33.

In all the forms the spring elements are within the spokes, and in all cases said spring elements engage pivots upon which the spokes turn, and by this means resist the oscillations of the spokes thereon—that being the only function of the spring elements.

The pivots 21 are made rigid with the face plates 17 to prevent their rotation in their bearings; while the spokes are radially disposed relative to the center of the wheel, as shown in Fig. 1, and are thus enabled, in combination with the spring elements within, to transmit rotary motion.

In use rotary movement is transmitted from the hub to the rim or vice versa. In the form illustrated in Figs. 2, 3 and 4, the springs will be moved relatively to the cam block or the cam block relatively to the springs. Supposing the hub to be driven, the tendency will be for the cam blocks to turn on the springs and motion will be transmitted through the cam blocks, springs and links to the rim, the springs on both sides of the cam blocks acting thereon at diagonal corners of the blocks. It will be noted that spokes in the vertical position support practically no weight. The instant, however, a spoke moves in either direction from the vertical position, it commences to bear a portion of the weight, the portion supported by each spoke increasing until it reaches the horizontal position and then decreasing until it reaches the vertical position again. This is owing to the fact that links are interposed between the spokes and the rim and the pivotal points of the links to the rim are out of alinement with the spokes.

In the form illustrated in Fig. 5, a different form of cam block is used, which acts upon a plate controlled by a strong coil spring disposed longitudinally of the spoke. In the form illustrated in Fig. 6, the cam blocks are dispensed with and transversely disposed coil springs are used, one end of each spring being rigidly secured to the pivot to the hub, the other ends of the springs bearing against the body of the spoke.

Having thus described my invention I claim:—

1. A vehicle wheel having a hub, a rim, spokes radially disposed relative to the center of the wheel, pivots within the hub upon which the spokes turn, and springs within the spokes engaging the pivots to resist oscillation of said spokes.

2. A resilient wheel comprising a hub, a rim, links pivoted to the rim, spokes pivotally connected to the hub and to the links, a cam block rigidly secured to the pivotal connection of each spoke to the hub, and a spring within the spoke which acts against the cam block to resist oscillations of the spoke.

3. A resilient wheel comprising a hub, a rim, links pivoted to the rim, radial spokes pivotally connected to the hub and to the links, an angular cam block rigidly secured to the pivotal connection of each spoke to the hub, and leaf springs within the spokes acting against the cam blocks to resist oscillations of the spokes.

In testimony whereof I affix my signature in presence of two witnesses.

WILLIAM R. HOPSON.

Witnesses:
H. W. MEADE,
E. M. CULVER.

Copies of this patent may be obtained for five cents each, by addressing the "Commissioner of Patents, Washington, D. C."